(12) United States Patent
Commander

(10) Patent No.: US 6,925,642 B1
(45) Date of Patent: Aug. 2, 2005

(54) DISTRIBUTED COMPUTER NETWORK WHICH SPAWNS INTER-NODE PARALLEL PROCESSES BASED ON RESOURCE AVAILABILITY

(75) Inventor: Darrell R. Commander, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/301,885

(22) Filed: Apr. 29, 1999

(51) Int. Cl.[7] .............................. G06F 9/46; G06F 15/16
(52) U.S. Cl. ...................... 718/104; 718/100; 718/102; 718/105; 709/201
(58) Field of Search ............................... 718/100–108; 709/200, 201, 205, 100–108

(56) References Cited

U.S. PATENT DOCUMENTS

| | | | | |
|---|---|---|---|---|
| 5,134,705 A | * | 7/1992 | Smith et al. ................... | 703/13 |
| 5,283,897 A | * | 2/1994 | Georgiadis et al. .......... | 709/105 |
| 5,325,525 A | * | 6/1994 | Shan et al. ................... | 718/104 |
| 5,394,549 A | * | 2/1995 | Stringfellow et al. ....... | 709/100 |
| 5,471,622 A | * | 11/1995 | Eadline .......................... | 707/3 |
| 5,745,746 A | * | 4/1998 | Jhingran et al. ............... | 707/2 |
| 5,768,594 A | * | 6/1998 | Blelloch et al. ............. | 717/149 |
| 5,910,951 A | * | 6/1999 | Pearce et al. ................ | 370/351 |
| 5,938,722 A | * | 8/1999 | Johnson ........................ | 709/105 |
| 6,108,309 A | * | 8/2000 | Cohoe et al. ................. | 370/241 |
| 6,173,246 B1 | * | 1/2001 | Billups, III .................. | 703/22 |
| 6,181,692 B1 | * | 1/2001 | DeGolia, Jr. ................. | 370/352 |
| 6,182,109 B1 | * | 1/2001 | Sharma et al. ............... | 709/104 |
| 6,216,127 B1 | * | 4/2001 | Gans et al. .................... | 707/10 |
| 6,314,114 B1 | * | 11/2001 | Coyle et al. ................. | 370/503 |
| 6,411,982 B2 | * | 6/2002 | Williams ..................... | 718/102 |
| 6,434,590 B1 | * | 8/2002 | Blelloch et al. ............. | 709/102 |
| 6,560,634 B1 | * | 5/2003 | Broadhurst .................. | 709/203 |

OTHER PUBLICATIONS

*Operating System Concepts*, Third Edition, Dec. 1990, Chapters 4, 5 & 6.
*Parallel Processing Activities In Japan (Part 3 of 3)*, Asian Technology Information Program, Feb. 25, 1999.
*Hitachi SR2201 Massively Parallel Processor*, Feb. 25, 1999.
*Named–Pipes And Sockets*, Mar. 15, 1999.
*Named Pipes*, Mar. 15, 1999.
*Tandem Web Advisory*, Mar. 9, 1999.

(Continued)

Primary Examiner—Meng-Al T. An
Assistant Examiner—Syed J Ali

(57) ABSTRACT

A parallel processing network permits processes to be spawned based on the availability of various network features. Such features may include the type of CPU's in the network, the number of CPU's per machine and other network resources. A user can select either a process group file method of process spawning or an automatic spawning method. In the automatic method, the user specifies various criteria related to how the processes are to be spawned such as the desired number of processes to be spawned, the type of CPUs to which the processes are to be spawned, the maximum number of processes to be started on any one machine and other information as desired. The spawning routine preferably runs on a root machine and accesses a process scheduler which provides the current network configuration. If CPUs and machines are available (i.e., operational) that match the user's criteria as determined by access to a process scheduler, the user desired number of processes is spawned to the CPUs and machines that match the criteria. If there are not enough CPUs and/or machines that match the user's criteria, the spawning routine decreases the number of processes from the user desired number of processes, and spawns processes to as many CPUs and machines that otherwise match the user's criteria. As such, the parallel processing network advantageously permits processes to be spawned automatically without requiring the user to have a detailed understanding of the available network features.

33 Claims, 5 Drawing Sheets

OTHER PUBLICATIONS

*Tandem's ServerNet, System Area Network for High-Performance Clustering,* Mar. 9, 1999.
*System Design For Low-Cost SIMD Computing,* Feb. 25, 1999.
*Peer-to-Peer Concepts* by Abdulla M. Mohamed, Mar. 9, 1999.
*MPI: A Message-Passing Interface Standard,* Jun. 12, 1995.

* cited by examiner

DISTRIBUTED COMPUTER NETWORK WHICH SPAWNS INTER-NODE PARALLEL PROCESSES BASED ON RESOURCE AVAILABILITY

CROSS-REFERENCE TO RELATED APPLICATIONS

Not applicable.

STATEMENT REGARDING FEDERALLY SPONSORED RESEARCH OR DEVELOPMENT

Not applicable.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention generally relates to a distributed parallel computer network. More particularly, the invention relates to parallel processing networks in which processes are created ("spawned") based on the type and nature of the features available in the network.

2. Background of the Invention

A computer generally executes a sequence of predefined instructions ("software"). A "serial" computer, such as most older standalone personal computers and many present day computers, includes a single processing unit that performs calculations one after another (ie., "serially"). The processing unit is usually a "microprocessor" or "central processing unit" (CPU). By contrast, a "parallel" processing computer architecture includes two or more processing units that can execute software instructions concurrently and thereby complete a task generally much faster than with a serial computer.

Parallel processing architectures are particularly well-suited to solving problems or performing tasks that would take an undesirably long period of time to be completed by a serial computer. For example, financial modeling techniques are used to predict trends in the stock markets, perform risk analysis, and other relevant financial tasks. These types of financial tasks generally require a rapid assessment of value and risk over a large number of stocks and portfolios. These tasks include computations that are largely independent of each other and thus readily lend themselves to parallel processing. By way of additional examples, parallel processing is particularly useful for predicting weather patterns, determining optimal moves in a chess game, and any other type of activity that requires manipulating and analyzing large data sets in a relatively short time.

Parallel processing generally involves decomposing a data set into multiple portions and assigning multiple processing units in the parallel processing network to process various portions of the data set using an application program, each processing unit generally processing a different portion of data. Accordingly, each processing unit preferably runs a copy of the application program (a "process") on a portion of the data set. Some processes may run concurrently while, if desired, other processes run sequentially. By way of example, a data set can be decomposed into ten portions with each portion assigned to one of ten processors. Thus, each processing unit processes ten percent of the data set and does so concurrently with the other nine processing units. Moreover, because processes can run concurrently, rather than sequentially, parallel processing systems generally reduce the total amount of time required to complete the overall task. The present invention relates to improvements in how processes are created in a parallel processing network.

A parallel processing system can be implemented with a variety of architectures. For example, an individual computer may include two or more microprocessors running concurrently. The Pentium® II architecture supports up to four Pentium®II CPUs in one computer. Alternatively, multiple machines may be coupled together through a suitable high-speed network interconnect. Giganet cLAN™ and Tandem ServerNet are examples of such network interconnects. Further, each machine itself in such a parallel network may have one or more CPUs.

One of the issues to be addressed when processing data in a parallel processing network is how to decompose the data and then how to assign processes to the various processing units in the network. One conventional technique for addressing this issue requires the system user to create a "process group" text file which includes various parameters specifying the number of processes to be spawned and how those processes are to be distributed throughout the network. A process group file thus specifies which CPUs are to run the processes.

A process group file implementation requires the system user to have a thorough understanding of the network. The system user must know exactly how many machines and CPUs are available, the type of CPUs and various other configuration information about the network. Further, the user must know which machines or CPUs are fully operational and which have malfunctioned. If the user specifies in the process group file that a malfunctioning machine should run a particular process, not knowing that the machine has malfunctioned, the entire system may lock up when other machines attempt to communicate with the broken machine, or experience other undesirable results. Thus, an improved technique for spawning processes in a parallel processing architecture is needed.

BRIEF SUMMARY OF THE INVENTION

The problems noted above are solved in large part by a parallel processing network that includes a plurality of processors, either one machine with multiple processors or multiple machines with one or more processors in each machine. If desired, the network advantageously permits processes to be spawned automatically based on the availability of various network features without requiring the system user to have a detailed understanding of the network's configuration. A user can select either the conventional process group file method of process spawning or an automatic spawning method.

In the automatic method, the user specifies various criteria related to how the processes are to be spawned. In accordance with the preferred embodiment, the criteria may include the name and location of the application program, the number of processes desired, a model type, a resource type, and the maximum number of CPUs to be used per machine for spawning processes. A spawning routine accesses a process scheduler which provides the current network configuration. If CPUs and machines are available (i.e., operational) that match the user's criteria as determined by access to the process scheduler, the user desired number of processes is spawned to the CPUs and machines that match the criteria. If there are not enough CPUs and/or machines that match the user's criteria, the spawning routine decreases the number of processes from the user desired number of processes, and spawns processes to as many CPUs and machines that otherwise match the user's criteria.

As such, the parallel processing network advantageously permits processes to be spawned automatically without requiring the user to have a detailed understanding of the available network features. Further, the network automatically takes advantage of any network redundancy in the event one or more machines is unavailable. Finally, the network will still attempt to spawn processes even if too few processes are available than can accommodate the number of processes the user initially desired. Overall, more robust process spawning logic is implemented with reduced involvement and expertise required by the user.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "parallel processing network" is used throughout the following description. That term is intended to encompass a computer system or network that includes multiple processing units. Accordingly, "parallel processing networks" may include a single machine that has two or more CPUs or a multi-machine network. Further, multi-machine networks may include networks, clusters or super-clusters of machines or workstations, distributed memory processors (processors that each have their own memory allocation), shared memory architectures (processors that share a common memory source), combinations of distributed and shared memory systems, or any other type of configuration having two or more processing units that can function independently from and concurrently with one another.

The term "spawning" refers to the process by which copies of an application program are provided to various processors in the parallel processing network. Each spawned application is referred to as a "process" and generally processes a portion of the overall data set. Thus, process spawning generally includes process creation.

The term "feature" is used throughout this disclosure to refer to various hardware and/or software aspects, functionality or components of a parallel processing network. As such, an individual machine may have one or more CPUs of a particular type and a network interface card and associated software. The number of CPUs in the machine, the type or model of CPUs and the network interface resource are all "features" of the parallel processing network. Moreover, the term "features" is intended to be a broad term encompassing numerous aspects of a parallel processing network that could be relevant to spawning processes.

DETAILED DESCRIPTION OF THE PREFERRED EMBODIMENTS

Figure 1:
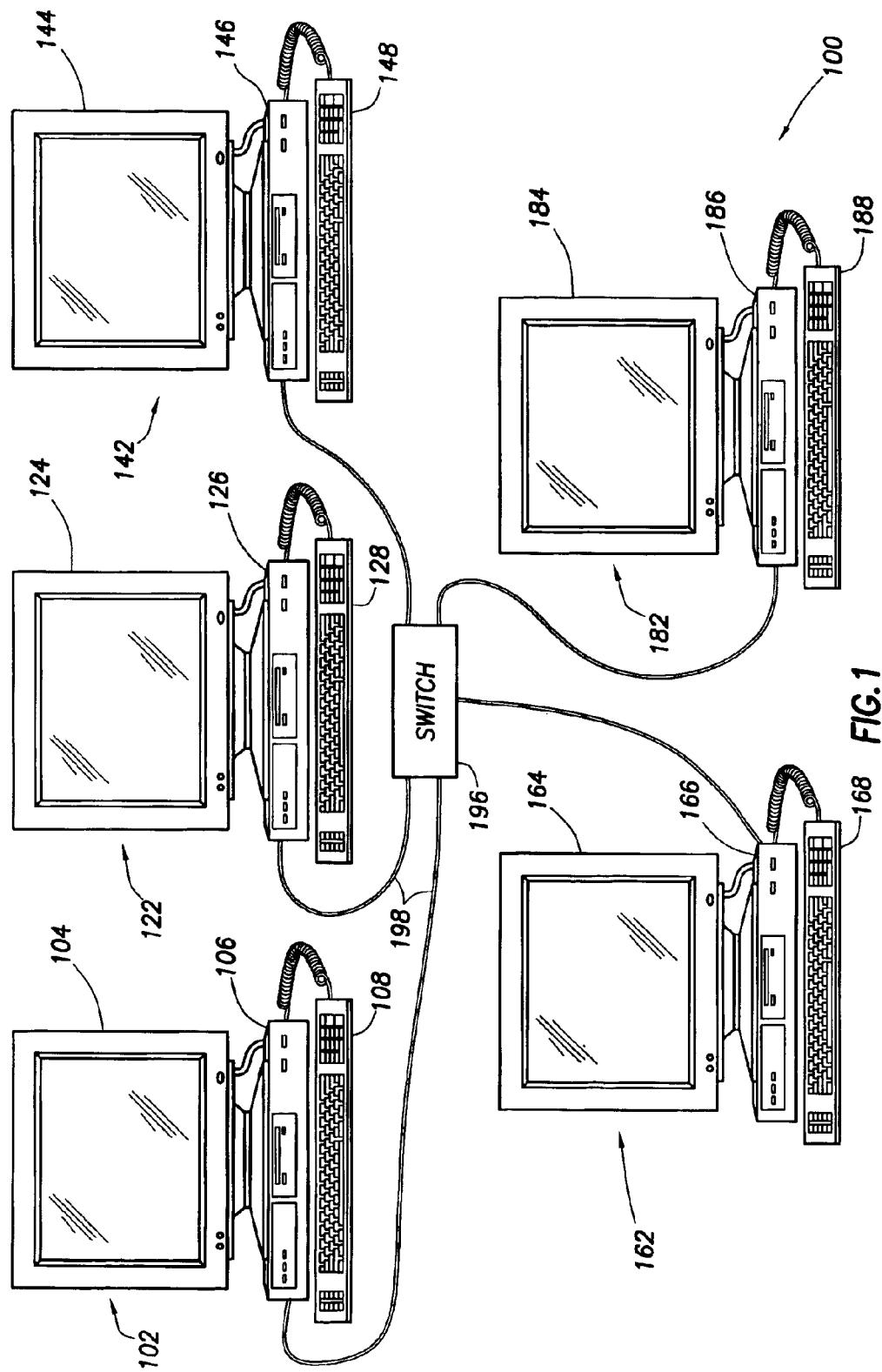
FIG. 1 shows a parallel processing network.

Referring now to FIG. 1, a parallel processing network 100 is shown in accordance with the preferred embodiment of the invention. The preferred embodiment of network 100 includes five computers or other suitable type of computing machine 102, 122, 142, 162, and 182, although as noted above other network embodiments may include only a single machine with multiple processors. Moreover, network 100 is shown in FIG. 1 with five machines, but alternatively, the network 100 may include any number of machines desired. The machines 102, 122, 142, 162, 182 preferably are coupled together by way of a switch 196 and cables 198. Switch 196 can be any suitable switch or router device such as a cLAN™ Cluster Switch manufactured by Giganet.

Each machine preferably includes a monitor, a chassis which includes the machine's core logic such as the processing unit or units and a keyboard or other input and control device. Thus, machine 102 includes a monitor 104, a chassis 106 and a keyboard 108. Machine 122 includes a monitor 124, a chassis 126 and a keyboard 128. Machine 142 includes a monitor 144, a chassis 146 and a keyboard 148. Machine 162 includes a monitor 164, a chassis 166 and a keyboard 168. Machine 182 includes a monitor 184, a chassis 186 and a keyboard 188. Alternatively, a central keyboard/mouse/monitor sharing switch can be utilized to route the input and output of each machine to a central keyboard, mouse, and monitor for the purpose of saving space.

Figure 2:
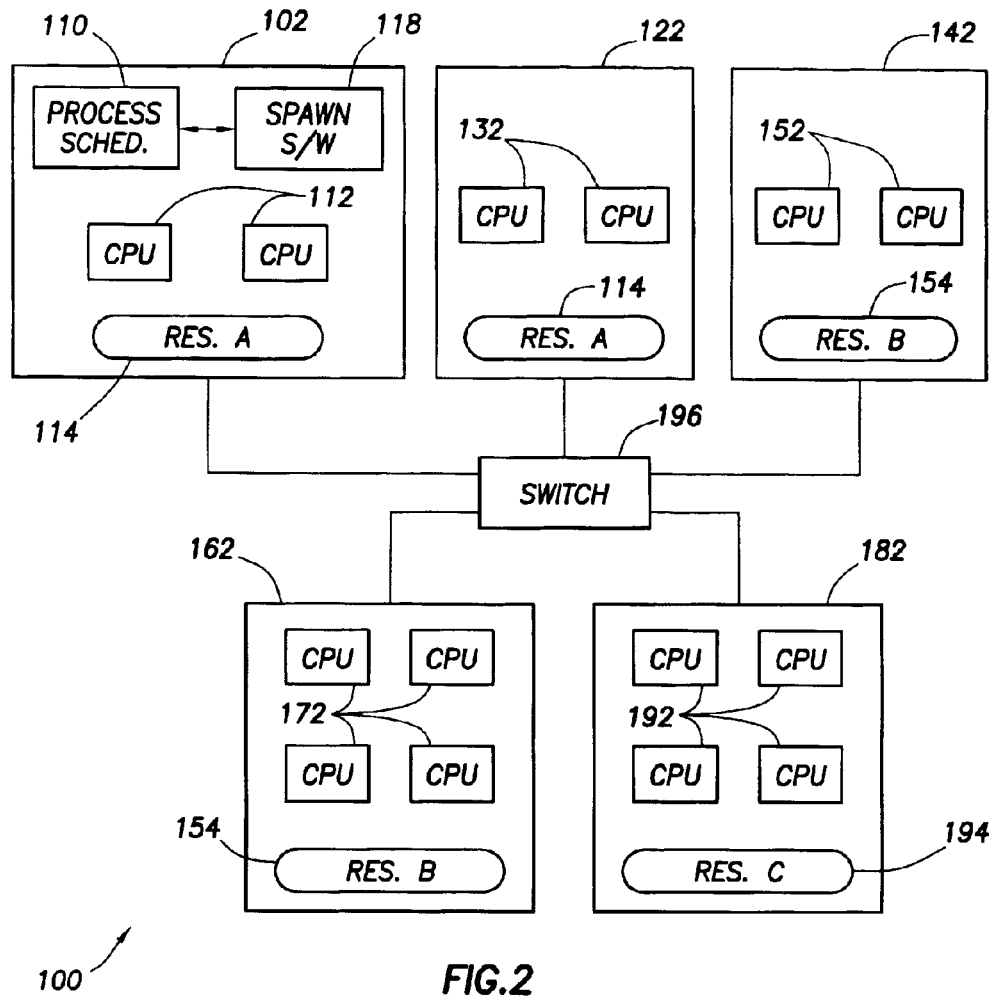
FIG. 2 shows a block diagram of the parallel processing network of FIG. 1.

Referring now to FIG. 2, parallel processing network 100 is shown with additional detail as to each machine. Each machine can be configured in any suitable manner and need not be configured to be the same as the other machines. As shown, machines 102 and 122 generally are configured the same as each other, but differently than machines 142, 162, 182. Machines 102 and 122 each include two CPUs 112, 132 as shown and at least one resource 114 (designated as Resource A in FIG. 2). Machine 142 also includes two CPUs 152. Machines 162 and 192 both include four CPU's 172 and 192, respectively. Machines 142 and 162 each include a resource 154 (Resource B) and machine 192 includes a resource 194 (Resource C). The machines 102, 122, 142, 162, 182 may include other components and functionality not shown in FIG. 2 as would be understood by one of ordinary skill in the art.

The CPU's in machines 102, 122, 142, 162, 182 can be any suitable device such as the Pentium® II, Pentium®III, Pentium® Pro, Motorola PowerPC, or Sun SPARC. Further, although the CPUs within a single machine preferably are the same, the CPUs between the various machines can be different. For example, machine 102 may include Pentium® II CPUs 112 while machine 162 includes Pentium Pro CPUs 172.

The "resources" 114, 154 and 194 generally refer to any software or hardware functionality associated with the machines. For example, the resources may include network interface cards and software such as Tandem ServerNet or Giganet cLAN™.

Machine 102 preferably is the "root" machine and, as such, preferably includes a process scheduler 110 and process spawning software 118. Although the process spawning logic preferably is implemented in software on the root machine 102, the spawning logic can be implemented in software in other machines or even in hardware if desired. The process scheduler preferably is implemented as a software program and database that maintains a list of the current network configuration. The process scheduler 110 maintains a list of various network parameters such as the number of machines available in the network, and for each machine the number of CPUs, the type or model of CPUs, the resources possessed by that machine, and the current memory and CPU availability. Suitable process schedulers include Load Sharing Facility (LSF™) provided by Platform Computing, Inc., Cluster CoNTroller™ provided by MPI Software Technology, Inc., or any suitable custom design. Additionally, the process scheduler 110 monitors the network 100 for failures of various machines or components of machines or is otherwise provided with failure information. Any application program can retrieve the network configuration information from process scheduler 110. By accessing process scheduler 110, an application can determine the network features that are available for use by the application.

Figure 3:
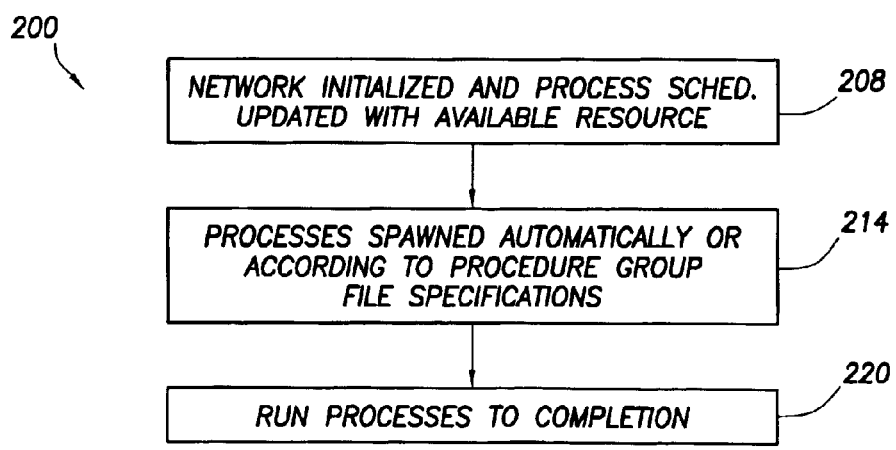
FIG. 3 is a flowchart of a method of initializing and operating the parallel processing network of FIG. 1 including spawning processes in accordance with the preferred embodiment.
Figure 4:
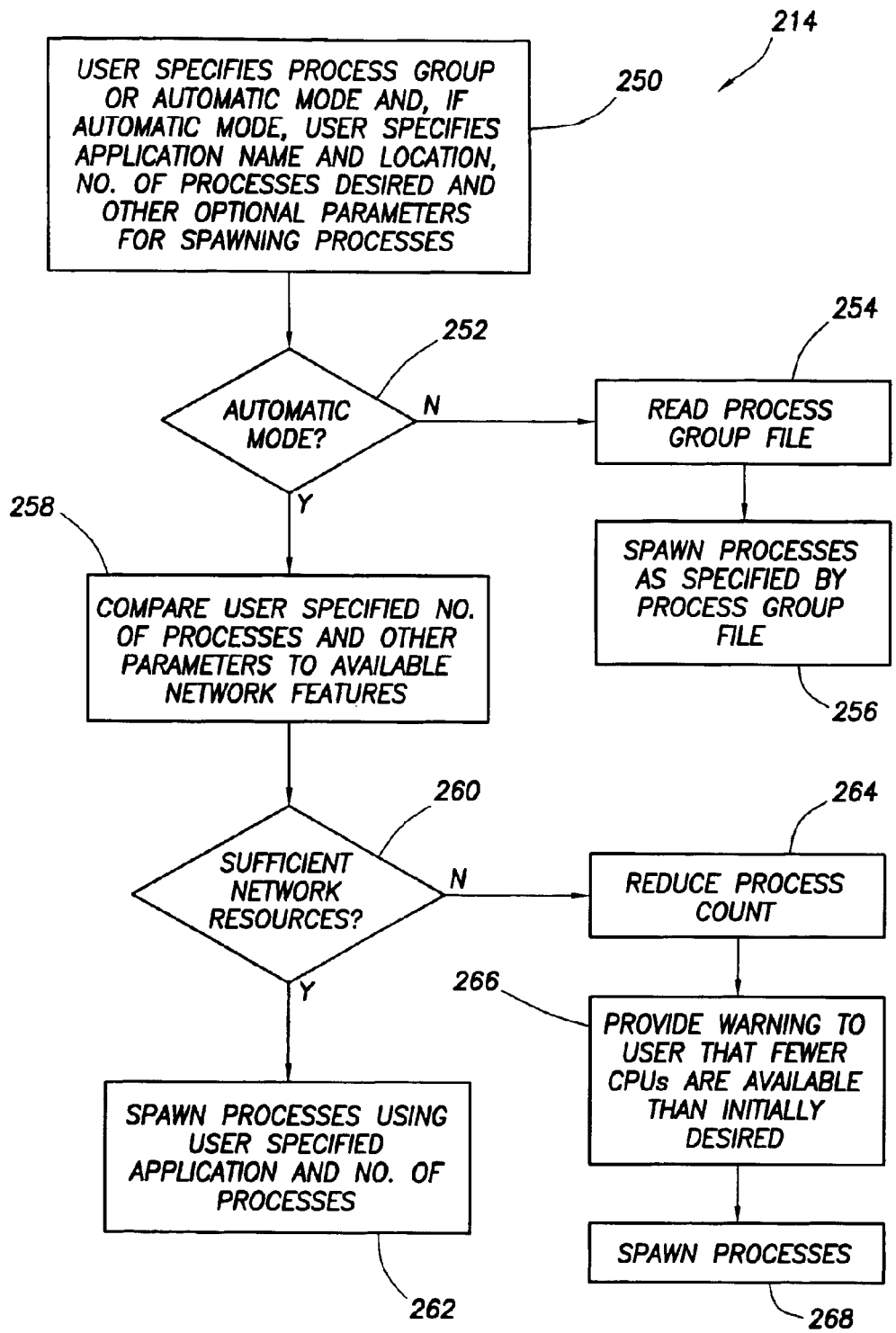
FIG. 4 is a more detailed flowchart of the preferred method for spawning processes shown in FIG. 3.

Referring now to FIG. 3, a preferred embodiment of a method 200 is shown for initiating and completing a parallel processing activity. As shown, method 200 includes step 208 in which the network 100 is initialized and the process scheduler 110 is updated with the available network features. Thus, any features or machines that have malfunctioned or are otherwise not available are excluded from the process scheduler 110 database. Accessing the process scheduler 110 thus permits an application to determine what features are, or are not, available. In step 214 the processes are spawned automatically or according to specifications written into a process group file by a system user. FIG. 4 provides additional detail about spawning step 214 and will be discussed below. Finally, the spawned processes are run in step 220 to completion.

Referring now to FIG. 4, process spawning step 214 preferably includes the steps shown, although numerous variations are also possible as would be appreciated by one of ordinary skill in the art after reviewing FIG. 4. These steps preferably are performed by software 118 (FIG. 2) on root machine 102. In step 250 a user specifies one of two modes of spawning processes—either the "process group file" mode or the "automatic" mode. The process group file mode includes any conventional technique whereby a process group file is created by the user that specifies which CPUs in the network 100 are to be used to run a predetermined number of processes. The user alternatively can specify the automatic mode whereby the user provides a list of criteria that determine how processes should be spawned. In accordance with the preferred embodiment, these criteria include any one or more of the following items: the name and location of the application program that will be spawned to the processors for processing the data, a number of processes desired to be run, a "model" type, a "resource" type, and the maximum number of CPUs to be used per machine to run spawned processes. The "model" can refer to any desired component of the parallel network 100. In accordance with the preferred embodiment, "model" refers to CPU model (e.g., Pentium® II). Similarly, the "resource" type can refer to anything desired, but preferably refers to the type of network interface in each machine. The spawning software 118 uses this information to determine whether sufficient network features exist which match the user's requirements and then spawns processes accordingly.

If the process group file mode has been selected, decision step 252 passes control to step 254 in which the spawning software 118 reads the user created process group file. In step 256, the root machine 102 then spawns processes as specified by the process group file.

If decision step 252, however, determines that the user has selected the automatic process spawning mode, control passes to step 258. In step 258 the user specified criteria (e.g., number of processes desired and other parameters) are compared to the network available features using the process scheduler 110. If there are sufficient CPUs and machines available that mach the user's criteria, as determined in decision step 260, the user desired number of processes are spawned in step 262 to the CPUs and machines selected by the spawning software 118 that match the user's criteria Copies of the application program are provided to each of the CPUs selected to execute a process.

If there are insufficient numbers of CPUs and machines that match the user's criteria, the spawning software 118 in step 264 reduces the number of processes initially specified by the user in step 250 to the number of CPUs that are available in machines that match the user's criteria. The spawning software 118 thus selects the CPUs and machines to be used to spawn the processes. In step 266 a warning message preferably also is provided to the user to tell the user that insufficient network features are available and the user's job is going to be spawned to the suitable machines and CPU's that are available. Finally, in step 268 the processes are spawned. In this step copies of the application program are provided to the CPUs selected in step 264 to run the processes. Each CPU preferably is also provided with the number of other CPUs running processes to permit each CPU to determine the portion of the data set that CPU should process.

As shown in FIG. 4, the spawning logic automatically spawns processes to the available CPUs and machines that match the criteria specified by the user. By automatically spawning processes, the user apriori need not assign specific processes to specific machines or CPUs as in conventional spawning methods. The user simply and conveniently specifies various desired criteria associated with the processes, such as the model of CPU to which processes should be assigned, the type of resource (e.g., A, B, or C in FIG. 2), and the maximum number of CPUs per machine. The spawning software 118 determines if a match exists between the specified parameters and the available CPU types and features in the network 100. If sufficient features and resources are available per the requirements specified by the user, the processes will be spawned to the various machines without the user having to specify a particular machine for each process. If sufficient CPUs are not available per the user's requirement, the spawning software 118 spawns processes to whatever CPUs are available that otherwise match the user's criteria. Spawning software 118 reduces the user's desired number of processes to the number of CPUs available in accordance with the other spawning criteria. Moreover, process spawning is dynamic and automatic meaning spawning decisions are made while the spawning process is running as to whether and how the processes are to be assigned to the various CPUs in the network.

Figure 5:
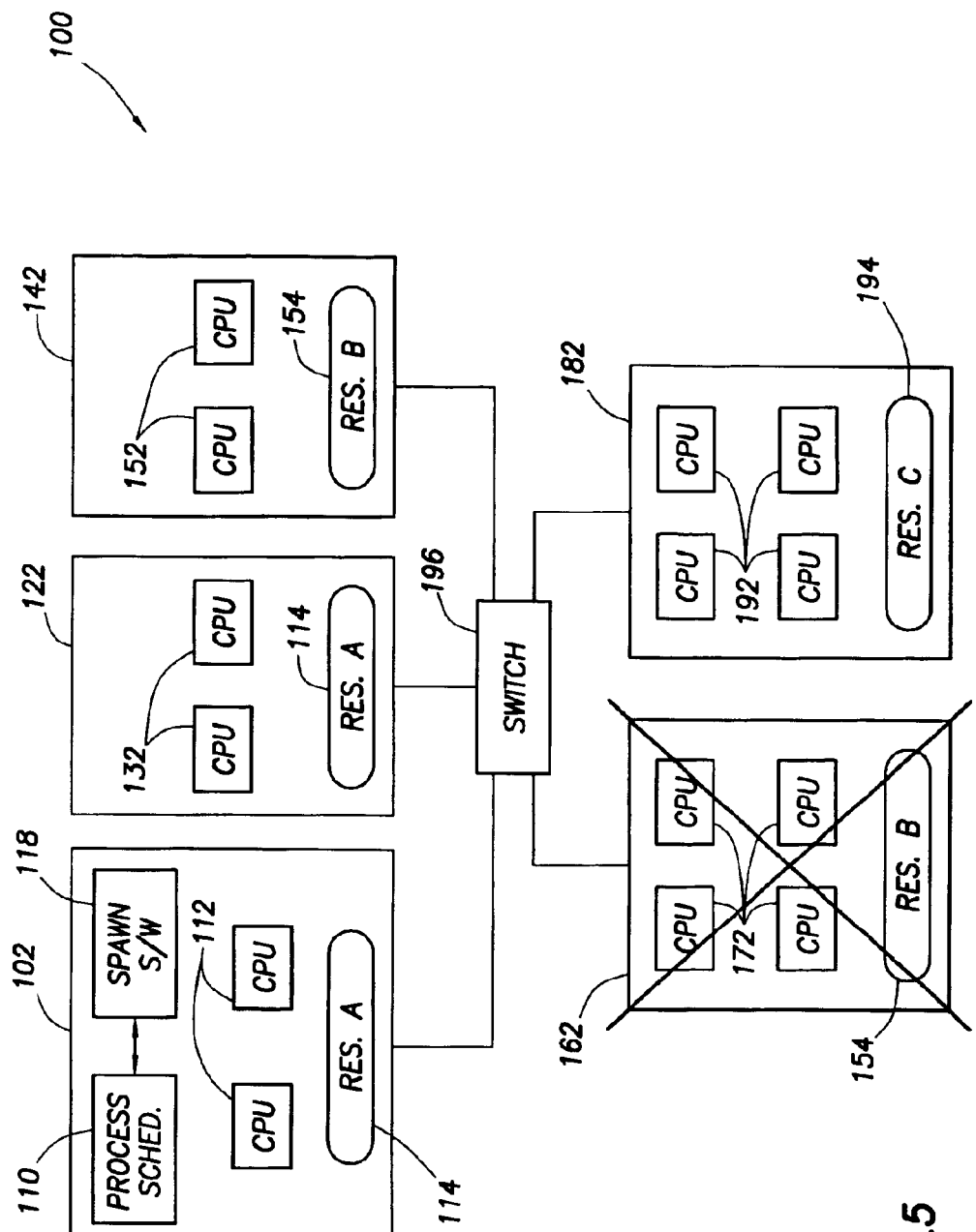
FIG. 5 illustrates the fault tolerance aspect of the parallel processing network of FIG. 3 and how the preferred method of spawning processes shown in FIGS. 3 and 4 takes advantage of that fault tolerance.

An additional advantage of parallel processing network 100 is the ability of the spawning logic to take advantage of any fault tolerance the network 100 may have. This benefit is illustrated in FIG. 5 in which the network 100 includes five machines, but machine 162 has malfunctioned (indicated by the X drawn through machine 162). By way of example, assuming the user wishes to divide a task into eight processes to be run concurrently. Eight processors are needed to satisfy the user's requirement. Even with machine 162 unavailable, more than enough processors still are available. As shown, 10 CPUs 112, 132, 152 and 192 are available in machines 102, 122, 142, 182. Thus, 10 CPUs are available but only 8 CPUs are needed and thus the 8 processes still can be spawned to the 10 available CPUs.

Figure 6:
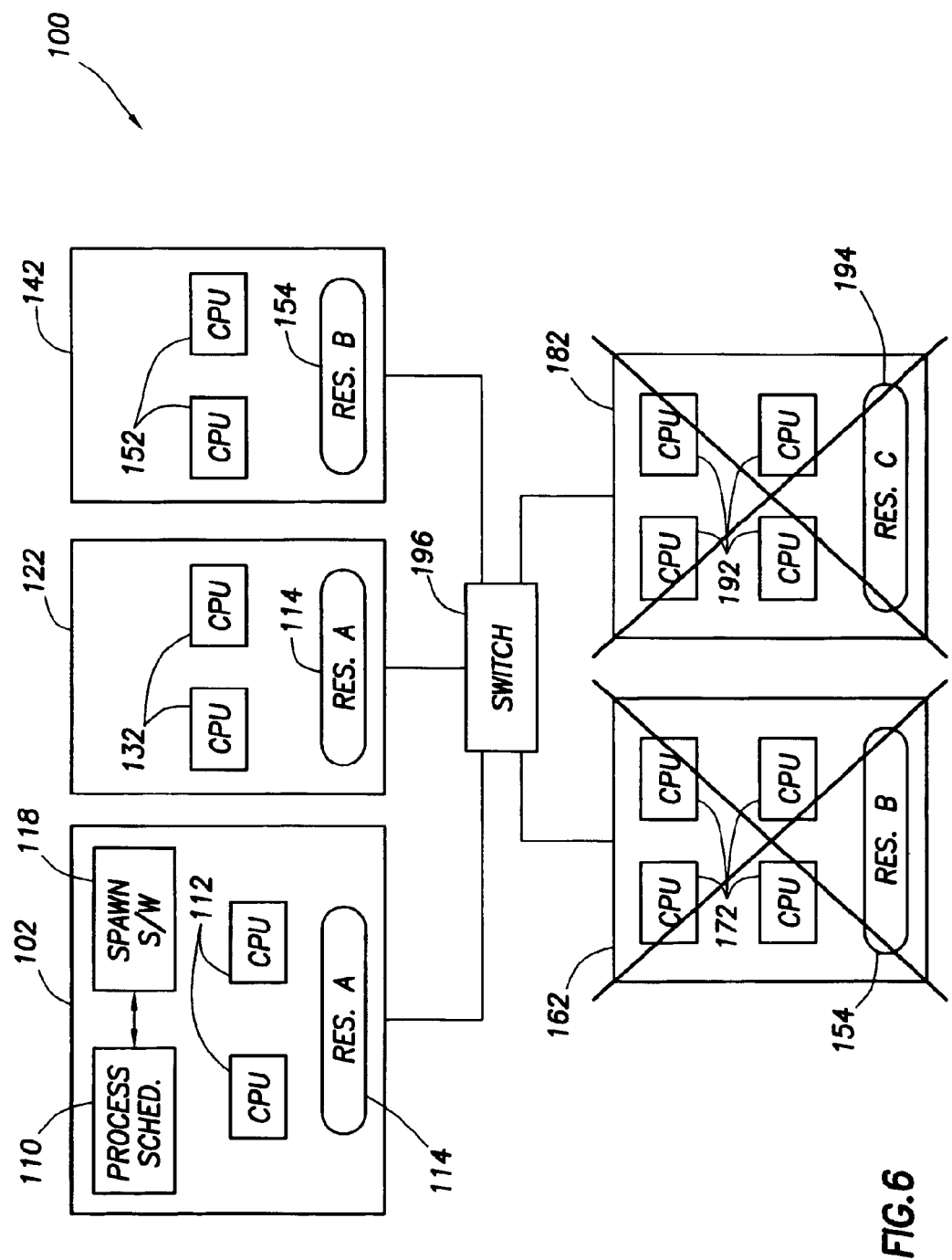
FIG. 6 illustrates how the preferred spawning method copes with the problem of insufficient network resources.

In the example of FIG. 6, however, both machines 162 and 182 have malfunctioned and are unavailable. The remaining machines 102, 122, 142 only have a total of 6 CPUs 112, 132, 152. As such, only 6 CPUs are available to execute the 8 desired processes. In this case the spawning software 118 reduces the number of processes to be run as discussed above. Thus, spawning software 118 uses the process scheduler 110 to determine which machines are available, alleviating the user from having to determine which CPUs are available and cope with problems created by spawning processes to CPUs that, unbeknownst to the user, are not available for use.

An exemplary software embodiment of the spawning logic is shown by the following source code listing. The software can be stored on a suitable storage medium such as a hard disk drive, CD ROM or floppy disk and executed during system operation.

```
/*
 * vimplrun.cpp
 * Copyright (C) 1998 Compaq Computer Corporation
 *
 * authors: Darrell Commander
 *
 * Process startup for VIMPL, utilizing LSF3.2.
 */
#include "windows.h"
#include "stdlib.h"
#include "malloc.h"
#include "stdio.h"
#include "direct.h"
#include "string.h"
#include "winerror.h"
extern "C" {
#include <isf\lsf.h>
#include <lsf\lsbatch.h>
void setRexWd_(char *);
}
#define MAX_ARGS 255
#define MAX_PROCS 512
#define MAX_TIDSIZE 512
#define MAX_PGLINE (MAX_PATH + MAX_COMPUTERNAME_LENGTH + 50)
#define right(a,b) max(&a(strlen(a) -b], a)
char seps[ ] = " \t\n\0";
HANDLE conHnd=NULL;
// This function sets the output text color to c
void color(unsigned short c)
{
    unsigned short tempclr=c& (~FOREGROUND_RED) & (~FOREGROUND_BLUE);
    if(conHnd==NULL) conHnd=GetStdHandle(STD_OUTPUT_HANDLE);
    // reverse red & blue to conform to ANSI standard indices
    if(c & FOREGROUND_RED) tempclr|=FOREGROUND_BLUE;
    if(c & FOREGROUND_BLUE) tempclr|=FOREGROUND_RED;
    SetConsoleTextAttribute(conHnd, tempclr);
}
char *lastoccurrence(char *string, const char *charset)
{
    char *ptr = string, *oldptr;
    do
    {
        if(ptr==string) oldptr=ptr;
        else oldptr=ptr-1;
        ptr=strpbrk(ptr, charset);
        if(ptr!=NULL) ptr++;
    } while (ptr!=NULL);
    return (oldptr);
}
void ParseArgs(char *commandline, char **argv, int *argc)
```

-continued

```
{
    char *ptr, *lastptr, *eos;   int doargs=0;
    *argc=0;
    ptr=commandline;   lastptr=commandline;
    eos = &commandline[strlen(commnandline)-1];
    do
    {
        if(*ptr=='\"')
        {
            argv[*argc]=strtok(ptr, "\"");
            if(argv[*argc]!=NULL)
                    {
                ptr=argv[*argc]+strlen(argv[*argc])+1;   lastptr=ptr-1;
                (*argc)++;
            }
            else {lastptr=ptr;   ptr++;}
        }
        else
        {
            if(!strchr(seps,*ptr))
            {
                if((strchr(seps,*lastptr)  || ptr==commandline))
                {
                    argv[*argc]=ptr;   (*argc)++;
                }
            }
            else
            {
                *ptr='\0';
            }
            lastptr=ptr;
            ptr++;
        }
    } while(ptr<=eos && *argc<MAX_ARGS-1);
    argv[*argc]=NULL;
}
class ProcessEntry {
public:
    char *machinename;
    int numprocs;
    char *exepath;
    char *stdinpath, *stdoutpath;
    ProcessEntry(void);
    ProcessEntry(char *machine, int np, char *exe, char*, char*);
    ProcessEntry *next;
};
//maintains a list of tids
class tidList {
public:
    int array[MAX_TIDSIZE];
    int tidindex, size;
    tidList(void);
    BOOL addTid(int tid);                //adds a tid to the tail of the tidlist
                                         // returns TRUE if success, false otherwise
};
class ProcessEntryList {
public:
    ProcessEntry *head;
    ProcessEntry *tail;
    int count;
    ProcessEntryList (void);
    void addEntry(ProcessEntry *pe);
};
char lineseperators[ ] = "\n";
char entryseps[ ] = " \t";
char allseps[ ] = " \t\n";
char appname[ ] = "VIMPLrun";
void printusage(void)
{
    color(7);
    printf("\n\
USAGE:\n\n\
");
    color(15);
    printf("\
%s <ProcGroup file> [-in <path>] [-using <file>] [args]\n\
", appname);
    color(7);
    printf("\
```

-continued

```
or\n\
");
    color(15);
    printf("\
%s <Executable> <processes> [-in <path>] [-using <file>]\n\
                [-model <type>] [-res <type>] [-pernode <#>] [args]\n\n\
", appname);
    color(7);
    printf("\
-in <path>              manually assign a working directory to all processes\n\
                          (default is for each process to run from the directory\n\
                          containing its executable.)\n\
-using <file>           manually assign a file from which to redirect the console\n\
                          input for all processes\n\
<processes>             0 = as many as possible\n\
-model <type>           execute only on hosts whose model matches <type>\n\
                          (run 'lshosts' to see a listing)\n\
-res <type>             execute only on hosts whose resources include <type>\n\
-pernode <#>            start no more than this many processes per node\n\
[args]                  command-line arguments to be passed along to the spawned\n\
                          processes\n\n\
");
    color(15);
    printf("\
VIMPLrun -h | -?\n\
");
    color(7);
    printf("\
Displays this usage message\n\
");
    color(7);
    exit(0);
}
//Display an error message if some system call fails
void displayError( ) {
    LPVOID lpMsgBuf;
    FormatMessage(FORMAT_MESSAGE_ALLOCATE_BUFFER | FORMAT_MESSAGE_FROM_SYSTEM,
                NULL,
                GetLastError( ),
                MAKELANGID(LANG_NEUTRAL, SUBLANG_DEFAULT), // Default language
                (LPTSTR) &lpMsgBuf,
                0,
                NULL);
    color(9);
    printf("%s\n",lpMsgBuf);
    color(7);
    LocalFree(lpMsgBuf);
}
//notify user of critical error. Display the windows error message, a vimpl message, and
exit the app.
inline void displayErrorAndFail(char *msg)
{
    displayError( );
    if (msg != NULL) {
        color(9);
        printf("Error: %s\n",msg);
        color(7);
    }
    exit(1);
}
// Main function
int main(int argc, char *argv[ ])
{
    int len, argstart, pgfile=1, overridewd=0, overridestdin=0, i, usemodel=0,
        useres=0, pernode=0;
    char wd[MAX_PATH+1], *stdinpath=NULL, *stdoutpath=NULL, *res=NULL,
        *model=NULL;
    FILE *hFile;
    if (argc < 2 || !stricmp(argv[1],"-h") || !stricmp(argv[1],"/h")
        || !stricmp(argv[1], "-?") || !stricmp(argv[1], "/?") )
        printusage( );
    // look to see if the file specified in program_path\program (arg2) exists
    if ((len = strlen(argv[1])) > MAX_PATH)
    {
        color(9);
        printf("ERROR: Path too long. Exiting.\n");
        color(7);
        exit(1);
    }
```

-continued

```
//Check for existence of .EXE or .PG file
if(!stricmp(right(argv[1],4), ".exe"))
      pgfile=0;
if ((hFile = fopen(argv[1], "r"))==NULL)
      {
      if(pgfile || (argv[1][0]=='\\' && argv[1][1]=='\\'))
      {
            color(9);
            printf("ERROR: Unable to open %s file. Exiting.\n", pgfile?".pg":".exe");
            color(7);
            exit(1);
      }
}
else {if(!pgfile) fclose(hFile);}
//Parse optional arguments
argstart=2+1-pgfile;
if(argc>3+1-pgfile)
{
      for(i=2+1-pgfile; i<argc; i++)
      {
            if(!stricmp(argv[i], "-wd") || !stricmp(argv[i], "-in"))
            {
                  if(i!=argc-1)
                  {
                        strcpy(wd, argv[i+1]);
                        overridewd=1;
                        argstart+=2;
                  }
                  else printusage( );
            }
            else if(!stricmp(argv[i], "-stdin") || !stricmp[argv[i], "-using"))
            {
                  if(i!=argc-1)
                  {
                        stdinpath=argv[i+1];
                        overridestdin=1;
                        argstart+=2;
                  }
                  else printusage( );
            }
            else if(!stricmp(argv[i], "-model"))
                              {
                              if(i!=argc-1)
                              {
                                    model=argv[i+1];
                                    usemodel=1;
                                    argstart+=2;
                              }
                              else printusage( );
            }
            else if(!stricmp(argv[i], "-res"))
            {
                  if(i!=argc-1)
                  {
                        res=argv[i+1];
                        useres=1;
                        argstart+=2;
                  }
                  else printusage( );
            }
            else if(!stricmp(argv[i], "-pernode"))
            {
                  if(i!=argc-1)
                  {
                        pernode=atoi(argv[i+1]);
                        argstart+=2;
                  }
                  else printusage( );
            }
      }
}
else if(argc<2+1-pgfile) printusage( );
//read through the file line at a time, and parse each line
// each line should be of the form: machine_name numprocs exepath\prog.exe
//   - figure out ranks and maximum size
char tempstr[MAX_PGLINE+1], *rootname;
int numnodes = 0, numprocs=0, cpus2use=0, root=0, rank=0;
char tempexe[MAX_PATH+1];   int tempnp;
char tempmachine[MAX_COMPUTERNAME_LENGTH+1];
```

-continued

```
            char redir1[MAX_PATH+2], redir2[MAX_PATH+2];
            ProcessEntryList peList;
            struct hostInfo *hostInfo;
    if(pgfile)
    {
        while(fgets(tempstr, MAX_PGLINE, hFile) !=NULL)
        {
            if(strlen(tempstr)>=1 && tempstr[0]=='#') continue;
            memset(redir1, '\0', MAX_PATH+2);
            memset(redir2, '\0', MAX_PATH+2);
            if(!overridestdin)
            {
                stdinpath=NULL;
            }
            stdoutpath=NULL;
            if(sscanf(tempstr, "%s%d%s%s%s", tempmachine, &tempnp, tempexe, redir1,
                redir2)>=3 && tempmachine!=NULL && tempnp>0 && tempexe!=NULL)
            {
                numprocs+=tempnp;
                numnodes++;
                if(stdinpath==NULL)
                {
                    if(redir1[0]=='<') stdinpath=&redir1[1];
                    else if(redir2[0]=='<') stdinpath=&redir2[1];
                }
                if(stdoutpath==NULL)
                {
                    if(redir1[0]=='>') stdoutpath=redir1;
                    else if(redir2[0]=='>') stdoutpath=redir2;
                }
                if(!root)
                {
                    rootname=__strdup(tempmachine);
                    root=1;
                }
                peList.addEntry(new ProcessEntry(tempmachine, tempnp, tempexe,
                    stdinpath, stdoutpath));
            }
        }
        cpus2use=numprocs;
        if(numprocs==0 || numnodes==0)
        {
            color(9);
            printf("ERROR: Empty .pg file. Exiting.\n");
            color(7);
            exit(1);
        }
        fclose(hFile);
    }
    else
    {
        int numavail;
        if((hostInfo = ls_gethostinfo(res, &numnodes, NULL, 0, 0))==NULL)
        {
            color(9);
            ls_perror("ls_gethostinfo");
            color(7);
            exit(1);
        }
        numavail=0;
        for(i=0; i<numnodes; i++)
        {
            if(!usemodel || !stricmp(hostInfo[i].hostModel, model))
            {
                numavail++;
                if(pernode) hostInfo[i].maxCpus=min(pernode, hostInfo[i].maxCpus);
                numprocs+=hostInfo[i].maxCpus;
            }
        }
        if(numavail==0 || numprocs==0)
        {
            color(9);
            printf("ERROR: No %shosts are available.\n",
                (usemodel||useres) ?"candidate ":"");
            color(7);
            exit(1);
        }
        cpus2use=atoi(argv[2]);
        if(cpus2use==0) cpus2use=numprocs;
```

-continued

```
if(cpus2use>numprocs)
{
    color(11);
    printf("WARNING: Only %d  CPUs available. Process count has been reduced.\n",
    numprocs);
    color(7);
    cpus2use=numprocs;
}
                for(i=0; i<numnodes; i++)
                {
                            if((!usemodel || !stricmp(hostInfo[i].hostModel, model))
        && hostInfo[i].maxCpus!=0)
                            {
                                        rank+=hostInfo[i].maxCpus;
                                        if(!root)
                                        {
                                                    rootname=__strdup(hostInfo[i].hostName);
                                                    root=1;
                                        }
                                        if(rank>cpus2use)
                                                    peList.addEntry(new ProcessEntry(hostInfo[i].hostName,
                cpus2use-(rank-hostInfo[i].maxCpus), argv[1], stdinpath,
                stdoutpath));
                                        else
                                                    peList.addEntry(new ProcessEntry(hostInfo[i].hostName,
                hostInfo[i].maxCpus, argv[1], stdinpath, stdoutpath));
                            }
                }
}
//at this point numprocs holds total number of processes
// and numnodes holds total # of nodes
if(numprocs<1 || cpus2use<1)
{
            color(9);
            printf("ERROR: Process count must be at least 1. \n");
            color(7);
            exit(1);
}
//init the lsf intirex stuff
if (ls_initrex(cpus2use, 0) < 0)
{
            ls_perror("ls_initrex");
            exit(1);
}
tidList tlist;
int instances, tid = 0;
char *command[MAX_ARGS], commandline[MAX_ARGS+MAX_PATH+1], *newcommandline;
ProcessEntry *pe;
rank=-1;
for (pe = peList.head; pe != NULL; pe = pe->next)
{
                            // set remote task to run from the .EXE's directory
                            if(!overridewd)
                            {
                                        strcpy (wd, pe->exepath);
                                        if(strstr(wd, "\\")) {*(lastoccurrence(wd, "\\")+1)='\0';}
                                        else {sprintf(wd, ".\0");}
                            }
                            //loop, creating an rtask for each of numprocs in the pe
                            for (instances = 0; instances < pe->numprocs; instances++)
                            {
                                        if((++rank)+1>cpus2use) continue;
                                        if(pe->stdinpath!=NULL)
                                                    sprintf(commandline, "type %s | %s", pe->stdinpath,
pe->exepath);
                                        else
                                                    sprintf(commandline, "%s", pe->exepath);
sprintf(commandline, "%s -vimpl_rank %d -vimpl_localrank %d -vimpl_size %d -
vimpl_localsize %d -vimpl_root %s -vimpl_wd %s",
                                                    commandline, rank, instances, cpus2use, pe->numprocs,
rootname, wd);
                                        if (pe->stdoutpath!=NULL)
                                        {
                                                    strcat(commandline, " ");  strcat(commandline, pe-
>stdoutpath);
                                        }
                                        newcommandline = __strdup(commandline);
                                        int numargs;
                                        ParseArgs(newcommandline, command, &numargs);
```

```
                                        command[numargs]=NULL;
                                        //now copy in the arguments
                                        if(argstart<argc)
                                        {
                                                for (i = argstart; i < argc; i++)
                                                        command[i-argstart+numargs] = _strdup(argv[i]);
                                                command[argc-argstart+numargs] = NULL;
                                        }
                                        //rtask does a non-blocking call to create processes
                                        if ( (tid = ls_rtask(pe->machinename, command, 0)) < 0 )
                                        {
                                                color(9);
                                                printf("Could not ls_rtask %s on node %s\n",
command[0],
                        pe->machinename);
                                                color(7);
                                        }
                                        else
                                        {
                                                if (!tlist.addTid(tid))
                                                {
                                                        color(9);
                                                        printf("Too many TIDs to keep track of.
Increase MAX_TID_SIZE.\n");
                                                        color(7);
                                                        exit(1);
                                                }
                                                else
                                                {
                                                        color(15);
                                                        printf("Started task on node %s\n", pe-
>machinename);
                                                        color(14);
                                                }
                                        }
                                }
                        }
                        //we've now started all the processes - let's wait on them
                        //wait for each of the processes
                        for (i=0; i<cpus2use; i++)
                        {
        // i holds a count of how many processes are left
                                LS_WAIT_T status;
                                tid = ls_rwait(&status, 0, NULL);
                                if (tid < 0)
                                {
                                                ls_perror("ls_rwait");
                                                color(9);
                                                printf("Error waiting for process with tid %d. Exiting. \n",tid);
                                                color(7);
                                                exit(1);
                                }
        // printf("Task %d finished.\n",tid);
                        }
                        color(7);
                        return 0;
};
void ProcessEntryList::addEntry(ProcessEntry *pe)
{
                if (head == NULL)
                {
                                //list is empty
                                head = pe;
                                tail = pe;
                                pe->next = NULL;
                }
                else
                {
                                //list has something in it
                                tail->next = pe;
                                pe->next = NULL;
                                tail = pe;
                }
                count++;
}
ProcessEntry::ProcessEntry(void) {
                machinename = " "; numprocs = 0; exepath = " "; stdinpath=NULL;
        stdoutpath=NULL;
                //argc = 0; args = NULL;
```

-continued

```
}
ProcessEntry::ProcessEntry(char *machine, int np, char *exe,
                                          char *stdinfile, char *stdoutfile)
{
        machinename = __strdup(machine); numprocs = np; exepath = __strdup(exe);
        if(stdinfile!=NULL) stdinpath=__strdup(stdinfile); else stdinpath=NULL;
        if(stdoutfile!=NULL) stdoutpath=__strdup(stdoutfile); else stdoutpath=NULL;
}
ProcessEntryList::ProcessEntryList(void)
{
        head = (ProcessEntry *) NULL; tail = (ProcessEntry *) NULL; count = 0;
}
tidList::tidList(void)
{
        tidindex = size = 0;
}
BOOL tidList::addTid(int tid)
{
        if (size < MAX_TIDSIZE)
        {
                array[size++] = tid;
                return TRUE;
        }
        else
                return FALSE;
}
```

The above discussion is meant to be illustrative of the principles of the present invention. Numerous variations and modifications will become apparent to those skilled in the art once the above disclosure is fully appreciated. For example, the embodiments described above can also be implemented in hardware if desired. It is intended that the following claims be interpreted to embrace all such variations and modifications.

What is claimed is:

1. A parallel processing network in which one or more processes can be spawned, comprising:
a plurality of computers coupled together by a communications link; and
process spawning logic included in one of said plurality of computers that automatically spawns processes in response to user specified criteria that control how the processes are to be spawned, and wherein said process spawning logic determines whether sufficient processors are available to spawn the processes and, if not, spawns a reduced number of processes based on the number of available processors;
wherein the user specified criteria comprises a number indicative of at least one process that the spawning logic should spawn and the user specified criteria also comprises a maximum number of CPUs to be used per machine to execute processes.

2. The parallel processing network of claim 1 wherein the communications link includes a switch.

3. The parallel processing network of claim 1 wherein the user specified criteria also includes a model parameter.

4. The parallel processing network of claim 3 wherein each of the plurality of computers includes a CPU and the model parameter refers to the type of CPU.

5. The parallel processing network of claim 1 wherein the user specified criteria includes a resource parameter.

6. The parallel processing network of claim 5 wherein each of said plurality of computers includes a network interface and the resource parameter refers to a type of network interface.

7. The parallel processing network of claim 1 wherein said process spawning logic compares the user specified criteria to network features.

8. The parallel processing network of claim 7 wherein the network features are maintained in a process scheduler included in one of said plurality of computers.

9. The parallel processing network of claim 7 wherein the network features include an identification of which of said plurality of computers is operational and which are nonoperational and the spawning logic.

10. The parallel processing network of claim 7 wherein each of said plurality of computers includes a CPU and the network features include the model of CPU.

11. The parallel processing network of claim 7 wherein each of said plurality of computers includes a network interface resource and the network features include the type of network interface resource.

12. The parallel processing network of claim 7 wherein the spawning logic spawns fewer processes than the user specified number of processes.

13. A parallel processing network, comprising:
a plurality of processors coupled together by a communications link;
a process scheduler accessible by at least one of said processors, said process scheduler maintains a list of network features;
spawning logic coupled to said process scheduler, said spawning logic receives a set of parameters from a user that control how processes are to be spawned by the root machine, the set of parameters including a user desired number indicative of at least one process to be spawned, said spawning logic determines whether a sufficient number of processors are available to permit the user desired number of processes to be spawned in accordance with the user specified parameters and, if not, spawns a reduced number of processes based on the number of available processors;
wherein said spawning logic also determines whether sufficient network features are available to permit the user desired number of processes to be spawned by accessing the process scheduler to read the list of network features.

14. The parallel processing network of claim 13 wherein the user parameters include a particular model of processor to which the processes are to be spawned.

15. The parallel processing network of claim 14 wherein the user parameters include a particular type of a network resource.

16. The parallel processing network of claim 15 wherein the user parameters include a maximum number of CPUs to use per machine for spawning processes.

17. A computer readable storage medium for storing an executable set of software instructions which, when inserted into a host computer system, is capable of controlling the operation of the host computer, said software instructions being operable to automatically spawn parallel processes in a parallel processing network, comprising:

a means for receiving user specified criteria that control how processes are to be spawned, said user specified criteria comprise a maximum number of CPUs to be used per machine to execute processes;

a means for reading a process scheduler to access a list of features associated with the parallel processing network;

a means for comparing the list of network features to the user specified criteria; and a means for spawning a number of processes that is reduced based on the number of available CPUs.

18. The computer readable storage medium of claim 17 wherein the user specified criteria includes a user desired number of processes to be spawned and said means for spawning processes includes a means for spawning the user desired number of processes if said means for comparing determines that the parallel processing network has sufficient features in accordance with the user specified criteria.

19. The computer readable storage medium of claim 18 wherein said means for spawning processes includes spawning fewer than the user desired number of processes if said means for comparing determines that the parallel processing network has insufficient features in accordance with the user specified criteria.

20. The computer readable storage medium of claim 18 wherein said means for spawning processes includes spawning fewer than the user desired number of processes if said means for comparing determines that the parallel processing network has insufficient CPUs to spawn the user desired number of processes.

21. A method of creating processes in a multiprocessor network comprising a plurality of computers, at least one computer having a plurality of processors, the method comprising:

receiving criteria that determine how the processes are to be created, the criteria including a maximum number of processors to be used in a computer to execute processes;

comparing the criteria to a database of network features to determine if there are a sufficient number of processors to accommodate the desired number of processes; and creating processes if a sufficient number of processors are available and, if a sufficient number of processors are not available, creating a reduced number of processes.

22. The method of claim 21 wherein receiving criteria includes receiving criteria that also include a model of processor and a resource type for running processes.

23. The method of claim 22 wherein the resource type includes a network interface resource type.

24. A method for spawning processes in a multiprocessor network, comprising:

specifying whether processes are to be spawned automatically to match a set of criteria or spawned in accordance with a process group file;

spawning processes to match the criteria if automatic spawning is specified;

spawning processes in accordance with the process group file if so specified; and spawning a reduced number of processes automatically or in accordance with the process group file based on a number of available processors.

25. The method of claim 24 further including determining whether the multiprocessor network matches the set of criteria if automatic spawning is specified.

26. A system in which one or more processes can be spawned, comprising:

a plurality of computers coupled together; and process spawning logic included in at least one of said plurality of computers that automatically spawns processes in response to user-specified criteria that control how the processes are to be spawned, and wherein said process spawning logic determines whether sufficient processors are available to spawn the processes and, if not, spawns a reduced number of processes based on the number of available processors;

wherein each computer comprises a network interface and the user-specified criteria comprises a type of network interface.

27. The system of claim 26 wherein the user-specified criteria also comprises a maximum number of CPUs to be used per machine to execute processes.

28. The system of claim 26 wherein the user-specified criteria also comprises a number of processes that the spawning logic should spawn.

29. A system in which one or more processes can be spawned comprising:

a plurality of computers coupled together; and process spawning logic included in at least one of said plurality of computers, said process spawning logic compares network features to user-specified criteria that comprises a number of processes to be spawned, and, if said spawning logic determines there are insufficient network features to spawn processes in accordance with the user-specified criteria, the spawning logic spawns fewer processes than the user-specified number of processes.

30. The system of claim 29 wherein the user-specified criteria also comprises a maximum number of CPUs to be used per machine to execute processes.

31. The system of claim 29 wherein each computer comprises a network interface and the user-specified criteria comprises a type of network interface.

32. A system, comprising:

a plurality of computers coupled together; and spawning logic adapted to run on a computer, said spawning logic receives a set of parameters from a user that control how processes are to be spawned, the set of parameters comprising a maximum number of CPUs to use per each of a plurality of machines for spawning processes, said spawning logic determines whether a sufficient number of CPUs are available to permit a user desired number of processes to be spawned in accordance with the user specified parameters and, if not, spawns a reduced number of processes based on the number of available CPUs.

33. The system of claim 32 wherein the set of parameters also comprises a number of processes that the spawning logic should spawn.

* * * * *